(12) United States Patent
Sun et al.

(10) Patent No.: US 12,140,491 B2
(45) Date of Patent: Nov. 12, 2024

(54) LARGE HIGH-SPEED ROTARY DEVICE GAP STACKING ASSEMBLY APPARATUS AND ASSEMBLY METHOD BASED ON DIGITAL TWIN

(71) Applicant: Harbin Institute of Technology, Harbin (CN)

(72) Inventors: Chuanzhi Sun, Harbin (CN); Huilin Wu, Harbin (CN); Yongmeng Liu, Harbin (CN); Jiubin Tan, Harbin (CN)

(73) Assignee: Harbin Institute of Technology, Harbin (CN)

( * ) Notice: Subject to any disclaimer, the term of this patent is extended or adjusted under 35 U.S.C. 154(b) by 238 days.

(21) Appl. No.: 17/969,985

(22) Filed: Oct. 20, 2022

(65) Prior Publication Data
US 2024/0102877 A1 Mar. 28, 2024

(30) Foreign Application Priority Data
Sep. 26, 2022 (CN) .......................... 202211178405.5

(51) Int. Cl.
*G01M 1/30* (2006.01)
*G01M 1/16* (2006.01)
(52) U.S. Cl.
CPC ................ *G01M 1/30* (2013.01); *G01M 1/16* (2013.01)

(58) Field of Classification Search
None
See application file for complete search history.

(56) References Cited

U.S. PATENT DOCUMENTS

| | | | |
|---|---|---|---|
| 6,288,465 B1 * | 9/2001 | Suzuki | F16C 32/0444 310/90.5 |
| 6,557,235 B1 * | 5/2003 | Katz | B23Q 7/04 414/749.6 |
| 9,695,707 B2 * | 7/2017 | Tan | F01D 21/003 |

* cited by examiner

*Primary Examiner* — Brandi N Hopkins
*Assistant Examiner* — Nigel H Plumb
(74) *Attorney, Agent, or Firm* — IPRO, PLLC; Na Xu

(57) ABSTRACT

Provided is a large high-speed rotary equipment gap stacking assembly apparatus and assembly method based on digital twin, and relates to the technical field of engine assembly measurement. The disclosure solves the problem of unbalanced rotation of the rotary parts caused by large assembly error during multi-stage rotary parts are stacked in a gap way. The disclosure includes the assembly apparatus entity and the assembly method; the assembly apparatus entity is configured to establish data communication with the upper computer through data acquisition apparatus, and upper computer is configured to establish a virtual assembly model; the virtual assembly model and optimal coaxiality of the multi-stage rotary parts in gap stacking can be obtained according to the assembly method, and the assembly process can be controlled by using the virtual assembly model and the optimal coaxiality. The disclosure is suitable for controlling the assembly process of the rotary parts.

10 Claims, 1 Drawing Sheet

US 12,140,491 B2

LARGE HIGH-SPEED ROTARY DEVICE GAP STACKING ASSEMBLY APPARATUS AND ASSEMBLY METHOD BASED ON DIGITAL TWIN

TECHNICAL FIELD

The disclosure relates to the technical field of engine assembly measurement.

BACKGROUND

The assembly process of a large high-speed rotary device represented by an aero-engine, a gas turbine, etc. is the last link in production and manufacturing, and it is also an extremely important link because the assembly quality directly affects the quality and performance of the whole machine.

Taking the aero-engine as an example, it has the characteristics of multiple stages of rotary parts and complex assembly process, it is needed to mount dozens of rotary parts on a shaft with the length smaller than one meter at the same time, and the multiple rotary parts are stacked in a gap way. Therefore, the assembly error might be rapidly amplified in the multi-stage rotary part mounting process, which causes the phenomenon of unbalanced rotation of the rotary parts, resulting in noise and vibration, and the performance and service life of the whole machine will be directly influenced.

The rotary parts of the existing aero-engine depend on manual debugging in the assembly process, the overall assembly efficiency is low due to the separation of the assembly process and the data analysis process, meanwhile, multiple operators are needed for cooperative operation, and the labor intensity is high.

SUMMARY

The disclosure solves the problems that when multi-stage rotary parts are stacked in a gap way, the assembly error is large, which leads to unbalanced rotation of the rotary parts, then noise and vibration are generated in the working process of a large high-speed rotary apparatus, and the performance and the service life of the whole machine are directly influenced.

In order to achieve above objective, the disclosure provides the following solution:

A large high-speed rotary device gap stacking assembly apparatus based on digital twin includes an assembly apparatus entity, a data acquisition apparatus and an upper computer;

the assembly apparatus entity is configured to establish data communication with the upper computer through the data acquisition apparatus, and the upper computer is configured to establish a virtual assembly model;

the assembly apparatus entity includes an air floatation rotary main shaft, a vertical air floatation guide rail, a center-adjusting and inclination-adjusting workbench, an upper left connecting piece, a lower left connecting piece, an upper left transverse measuring rod, a lower left transverse measuring rod and an inductive sensor;

the center-adjusting and inclination-adjusting workbench is stacked on the air floatation rotary main shaft, and the center-adjusting and inclination-adjusting workbench is coaxial with the air floatation rotary main shaft; the vertical air floatation guide rail is arranged on the side surface of the air floatation rotary main shaft, the upper left connecting piece and the lower left connecting piece are sequentially arranged on the vertical air floatation guide rail in a sleeving mode from top to bottom, the upper left transverse measuring rod is nested on the upper left connecting piece, and the lower left transverse measuring rod is nested on the lower left connecting piece;

the inductive sensor includes an axial inductive sensor and a radial inductive sensor, the axial inductive sensor is fixed on the upper left transverse measuring rod and is configured to detect axial surface data of the rotary parts, and the radial inductive sensor is fixed on the lower left transverse measuring rod and is configured to detect radial surface data of the rotary parts; and the data acquisition apparatus is configured to drive the inductive sensor to acquire data and transmit the data to the upper computer, the upper computer is configured to integrate the acquired data to the virtual assembly model, and synchronously analyze and compute the acquired data so as to obtain optimal coaxiality of the multi-stage rotary parts in gap stacking.

Further, in a preferred embodiment, the upper left connecting piece and the lower left connecting piece are configured to slide on the vertical air floatation guide rail in a vertical direction.

Further, in a preferred embodiment, the upper left transverse measuring rod is configured to move on the upper left connecting piece in a horizontal direction.

Further, in a preferred embodiment, the lower left transverse measuring rod is configured to move on the lower left connecting piece in a horizontal direction.

Further, in a preferred embodiment, the assembly apparatus further includes a granite base; the air floatation rotary main shaft is embedded in the center position of the granite base; and the vertical air floatation guide rail is fixedly mounted on the granite base.

Further, in a preferred embodiment, the assembly apparatus further includes AR glasses, the AR glasses are connected with the upper computer, data information received and computed by the upper computer is displayed on the AR glasses, and thus the data information can be displayed in real time.

A large high-speed rotary device gap stacking assembly method based on digital twin is achieved based on the large high-speed rotary device gap stacking assembly apparatus based on digital twin according to any one of the above embodiments. The method specifically includes the following steps:

S1, wearing the AR glasses, establishing data communication between the assembly apparatus entity and the upper computer through the data acquisition apparatus by using a virtual-real registration technology, and establishing the virtual assembly model through the upper computer;

S2, placing a to-be-tested rotary part on the center-adjusting and inclination-adjusting workbench for fixing;

S3, rotating the air floatation rotary main shaft to drive the to-be-tested rotary part to rotate at a constant speed;

S4, driving the radial inductive sensor to conduct sampling measurement on a radial mounting reference surface of the to-be-tested rotary part at equal intervals through the data acquisition apparatus so as to obtain the radial reference surface eccentricity of the rotary part, transmitting the radial reference surface eccentricity to the virtual assembly model, and displaying the data information on the AR glasses at the same time;

S5, driving the axial inductive sensor to conduct sampling measurement on an axial mounting reference surface of the to-be-tested rotary part at equal intervals through the data acquisition apparatus so as to obtain the axial reference surface eccentricity of the rotary part, transmitting the axial reference surface eccentricity to the virtual assembly model, and displaying data information on the AR glasses at the same time;

S6, arranging the center-adjusting and inclination-adjusting workbench through the virtual assembly model according to the magnitude and direction of the radial reference surface eccentricity and the axial reference surface eccentricity of the rotary part so as to make the rotary part and the center-adjusting and inclination-adjusting workbench concentric;

S7, driving the radial inductive sensor to conduct sampling measurement on a radial mounting measurement surface of the rotary part at equal intervals through the data acquisition apparatus so as to obtain the concentricity of the rotary part, and transmitting the concentricity to the virtual assembly model; driving the axial inductive sensor to conduct sampling measurement on an axial mounting measurement surface of the rotary part at equal intervals through the data acquisition apparatus so as to obtain the perpendicularity of the rotary part, and transmitting the perpendicularity to the virtual assembly model;

S8, driving the inductive sensor to measure all the rotary parts required for assembly through the data acquisition apparatus so as to obtain the concentricity and the perpendicularity of the multi-stage rotary parts, transmitting the concentricity and the perpendicularity to the virtual assembly model, and displaying data information on the AR glasses at the same time;

S9, integrating the collected data information through the virtual assembly model, and analyzing and computing an accumulated eccentric error generated by gap stacking of the multi-stage rotary parts through the upper computer according to the concentricity and the perpendicularity of the multi-stage rotary parts;

S10, computing the optimal coaxiality of the multi-stage rotary parts in gap stacking through the upper computer according to the accumulated eccentric error generated by gap stacking of the multi-stage rotary parts, and displaying the optimal coaxiality of the multi-stage rotary parts in gap stacking on the AR glasses; and S11, controlling the assembly process by using the virtual assembly model and the optimal coaxiality of the multi-stage rotary parts in gap stacking displayed on the AR glasses.

Further, in a preferred embodiment, the accumulated eccentric error generated by gap stacking of the multi-stage rotary parts in the step S9 is specifically shown as follows:

$$Rotor_{0-n} = \sum_{i=1}^{n} Rotor_{ri} Rotor_{Zi} Rotor_{clearancei} Rotor_{dzi} Rotor_{orientationi}$$

$$= \begin{bmatrix} \prod_{i=1}^{n} Mo_{Zi} Mo_{Xi} Mo_{Yi} & \sum_{i=1}^{n} \left( \prod_{j=2}^{i} Mo_{Zj-1} Mo_{Xj-1} Mo_{Yj-1} \right) Mo_{Zi}(S_i + dS'_i + dS_i) \\ 0^T & 1 \end{bmatrix}$$

wherein $Rotor_{ri}$ is a transformation matrix between joint surfaces of two-stage rotary parts; $Rotor_{Zi}$ is the eccentricity of an ideal circle center of a rotary part i; $Rotor_{clearncei}$ is a translation transformation matrix of the reference surface gap eccentricity of the rotary part i; $Rotor_{dzi}$ is an eccentric translation transformation matrix caused by a reference surface machining error of the rotary part i; $Rotor_{orientationi}$ is a rotation transformation matrix from the reference surface of the rotary part i to the rotation center of an assembly surface; $Mo_{Xi}$ is a rotation matrix of the reference surface of an $i^{th}$-stage rotary part around an X axis; $Mo_{Yi}$ is the rotation matrix of the reference surface of the $i^{th}$-stage rotary part around a Y axis; $Mo_{Zi}$ is the rotation matrix of the $i^{th}$-stage rotary part around a Z axis; $S_i$ is an ideal position vector of the circle center of the assembly surface of the $i^{th}$-stage rotary part; $dS'_i$ is a gap eccentric position vector of the $i^{th}$-stage rotary part; $dS_i$ is a machining error vector of the circle center position of the assembly surface of the $i^{th}$-stage rotary part; $Mo_{Zj-1}$ is the rotation matrix of the reference surface of a $(j-1)^{th}$-stage rotary part around the Z axis; $Mo_{Xj-1}$ is the rotation matrix of the reference surface of the $(j-1)^{th}$-stage rotary part around the X axis; and $Mo_{Yj-1}$ is the rotation matrix of the reference surface of the $(j-1)^{th}$-stage rotary part around the Y axis.

Further, in a preferred embodiment, the step S10 specifically includes:
computing axial projections of the circle center positions of the assembly surfaces of the multi-stage rotary parts through the upper computer according to the accumulated eccentric error generated by the gap stacking of the multi-stage rotary parts, and computing the optimal coaxiality of the multi-stage rotary part in gap stacking through the upper computer according to the axial projections of the circle center positions of the assembly surfaces of the multi-stage rotary parts.

Further, in a preferred embodiment, the axial projections of the circle center positions of the assembly surfaces of the multi-stage rotary parts are specifically as follows:

$$\begin{bmatrix} dx_{0-n} \\ dy_{0-n} \end{bmatrix} = \sum_{i=1}^{n} \left( \prod_{j=2}^{i} Mo_{Zj-1} Mo_{Xj-1} Mo_{Yj-1} \right) Mo_{Zi}(S_i + dS'_i + dS_i)$$

wherein $Mo_{Zi}$ is the rotation matrix of the $i^{th}$-stage rotary part around the Z axis; $S_i$ is the ideal position vector of the circle center of the assembly surface of the $i^{th}$-stage rotary part; $dS'_i$ is the gap eccentric position vector of the $i^{th}$-stage rotary part; and $dS_i$ is the machining error vector of the circle center position of the assembly surface of the $i^{th}$-stage rotary part.

Technical Effects

The disclosures provides the large high-speed rotary device gap stacking assembly apparatus based on digital twin, and solves the problems that when multi-stage rotary parts are stacked in a gap way, the assembly error is large, which leads to unbalanced rotation of the rotary parts, then noise and vibration are generated in the working process of the large high-speed rotary apparatus, and the performance and the service life of the whole machine are directly influenced.

Compared with the prior art, the disclosure has the following advantages:

1. According to the existing aero-engine, it is needed to mount dozens of rotary parts on a shaft with the length smaller than one meter, the multiple rotary parts are stacked in a gap way, the assembly error of the multi-stage rotary parts will be rapidly amplified in the working process, which leads to unbalanced rotation of the rotary parts, then noise and vibration are generated in the working process of the large high-speed rotary apparatus, and the performance and the service life of the whole machine are directly influenced. The disclosure provides the large high-speed rotary device gap stacking assembly apparatus based on digital twin, the inductive sensor is arranged on the assembly apparatus, the data acquisition apparatus is configured to drive the inductive sensor to acquire data information of the rotary parts and transmit the data information to the virtual assembly model, meanwhile, the upper computer is configured to analyze and compute the data information to obtain optimal coaxiality of the multi-stage rotary parts in gap stacking, and a worker can control the assembly process by using the optimal coaxiality of the multi-stage rotary parts in gap stacking. The problems that when the multi-stage rotary parts are assembled in a gap stacking way, the generated assembly error will be rapidly amplified in the working process, which leads to unbalanced rotation of the rotary parts, then noise and vibration are generated in the working process of the large high-speed rotary apparatus, and the performance and the service life of the whole machine are directly influenced are solved.

2. The disclosure provides the large high-speed rotary device gap stacking assembly apparatus based on digital twin, the AR glasses are configured to display the data information measured by the inductive sensor in the assembly process in real time so as to control the assembly process, and the AR glasses are capable of monitoring the data change generated by the multi-stage rotary parts in the assembly process in real time, and therefore, intelligent assembly is achieved.

The disclosure is suitable for the technical field of engine assembly and used for measuring the assembly error of the rotary parts of the engine.

In the figures, 1-granite base; 2-air floatation rotary main shaft; 3-vertical air floatation guide rail; 4-center-adjusting and inclination-adjusting workbench; 5a-lower left connecting piece; 5b-upper left connecting piece; 6a-lower left transverse measuring rod; 6b-upper left transverse measuring rod; 7-radial inductive sensor; 8-axial inductive sensor; 9-AR glasses; and 10-upper computer.

DETAILED DESCRIPTION

Figure 1:
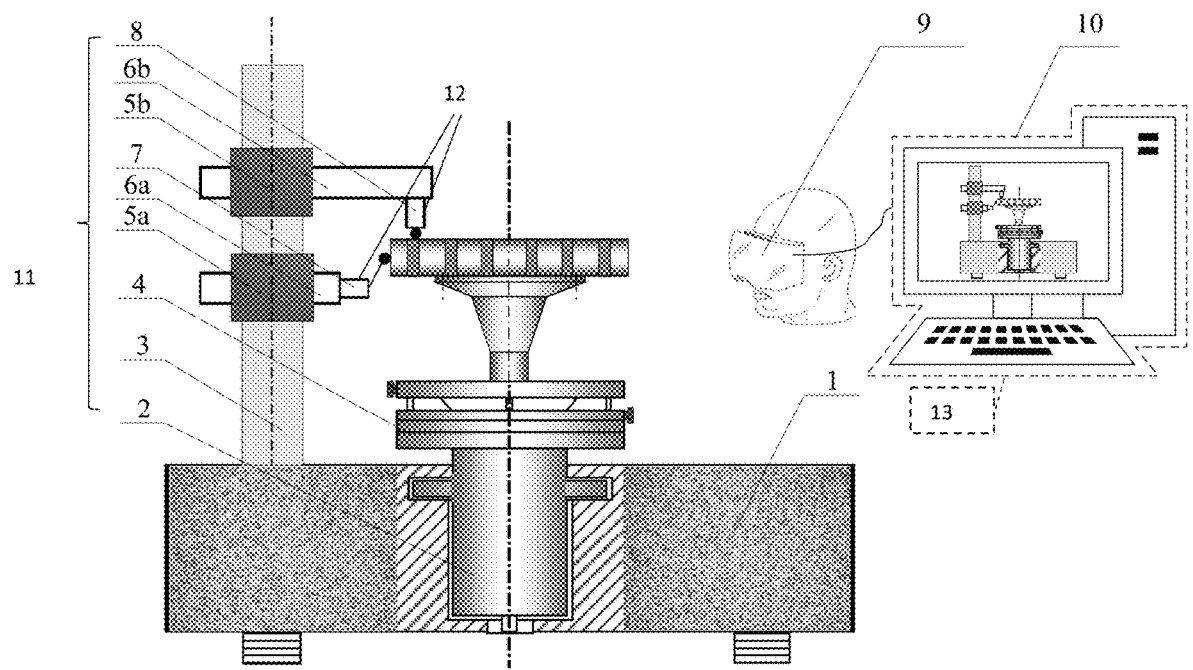
FIG. 1 is a structural schematic diagram of a large high-speed rotary device gap stacking assembly apparatus based on digital twin driving in Embodiments 1 to 7.

Embodiment 1. This embodiment is described as shown in FIG. 1, this embodiment provides a large high-speed rotary device gap stacking assembly apparatus based on digital twin, and the assembly apparatus includes an assembly apparatus entity (11), a data acquisition apparatus (13) and an upper computer (10).

The assembly apparatus entity (11) is configured to establish data communication with the upper computer (10) through the data acquisition apparatus (13), and the upper computer (10) is configured to establish a virtual assembly model.

The assembly apparatus entity (11) includes an air floatation rotary main shaft (2), a vertical air floatation guide rail (3), a center-adjusting and inclination-adjusting workbench (4), an upper left connecting piece (5b), a lower left connecting piece (5a), an upper left transverse measuring rod (6b), a lower left transverse measuring rod (6a) and an inductive sensor (12).

The center-adjusting and inclination-adjusting workbench (4) is stacked on the air floatation rotary main shaft (2), and the center-adjusting and inclination-adjusting workbench is coaxial with the air floatation rotary main shaft. The vertical air floatation guide rail (3) is arranged on the side surface of the air floatation rotary main shaft (2), the upper left connecting piece (5b) and the lower left connecting piece (5a) are sequentially arranged on the vertical air floatation guide rail (3) in a sleeving mode from top to bottom, the upper left transverse measuring rod (6b) is nested on the upper left connecting piece (5b), and the lower left transverse measuring rod (6a) is nested on the lower left connecting piece (6b).

The inductive sensor (12) includes an axial inductive sensor (8) and a radial inductive sensor (7), the axial inductive sensor (8) is fixed on the upper left transverse measuring rod (6b) and is configured to detect axial surface data of rotary parts, and the radial inductive sensor (7) is fixed on the lower left transverse measuring rod (6a) and is configured to detect radial surface data of the rotary parts.

The data acquisition apparatus (13) is configured to drive the inductive sensor (12) to acquire data and transmit the data to the upper computer (10), the upper computer (10) is configured to integrate the acquired data to the virtual assembly model, and synchronously analyze and compute the acquired data so as to obtain optimal coaxiality of the multi-stage rotary parts in gap stacking.

According to this embodiment, in practical application, the assembly apparatus entity is configured to establish data communication with the upper computer through the data acquisition apparatus, and the upper computer is configured to establish the virtual assembly model. The inductive sensor is arranged on the assembly apparatus entity and configured to measure data information of the rotary parts and transmit the data information to the virtual assembly model for integration. Meanwhile, the upper computer is configured to analyze and compute the data information to obtain optimal coaxiality of the multi-stage rotary parts in gap stacking. A worker can control the assembly process by using the virtual assembly model and the optimal coaxiality of the multi-stage rotary parts in gap stacking.

According to the existing aero-engine, it is needed to mount dozens of rotary parts on a shaft with the length smaller than one meter, the multiple rotary parts are stacked in a gap way, the assembly error of the multi-stage rotary parts will be rapidly amplified in the working process, which leads to unbalanced rotation of the rotary parts, then noise and vibration are generated in the working process of the large high-speed rotary apparatus, and the performance and the service life of the whole machine are directly influenced. This embodiment provides the large high-speed rotary device gap stacking assembly apparatus based on digital twin, the inductive sensor is arranged on the assembly apparatus, and the data acquisition apparatus is configured to drive the inductive sensor to acquire data information of the rotary parts and transmit the data information to the virtual assembly model. Meanwhile, the upper computer is configured to analyze and compute the data information to obtain optimal coaxiality of the multi-stage rotary parts in gap stacking. A worker can control the assembly process by using the optimal coaxiality of the multi-stage rotary parts in gap stacking. The problems that when the multi-stage rotary parts are assembled in a gap stacking way, the generated assembly error will be rapidly amplified in the working process, which leads to unbalanced rotation of the rotary parts, then noise and vibration are generated in the working process of the large high-speed rotary apparatus, and the performance and the service life of the whole machine are directly influenced are solved.

Embodiment 2. This embodiment is described as shown in FIG. 1, this embodiment is to illustrate the motion trails of the upper left connecting piece (5*b*) and the lower left connecting piece (5*a*) in the large high-speed rotary device gap stacking assembly apparatus based on digital twin in Embodiment 1, and the upper left connecting piece (5*b*) and the lower left connecting piece (5*a*) are configured to slide on the vertical air floatation guide rail (3) in a vertical direction.

According to this embodiment, in practical application, the upper left connecting piece (5*b*) and the lower left connecting piece (5*a*) are configured to slide on the vertical air floatation guide rail (3) in the vertical direction, then the axial inductive sensor (8) and the radial inductive sensor (7) are driven to move up and down, thus the rotary parts of different sizes or shapes can be measured, and the large high-speed rotary device gap stacking assembly apparatus based on digital twin in this embodiment is more flexible.

Embodiment 3. This embodiment is described as shown in FIG. 1, this embodiment is to illustrate the motion trail of the upper left transverse measuring rod (6*b*) in the large high-speed rotary device gap stacking assembly apparatus based on digital twin in Embodiment 1, and the upper left transverse measuring rod (6*b*) is configured to move on the upper left connecting piece (5*b*) in a horizontal direction.

According to the this embodiment, in practical application, the upper left transverse measuring rod (6*b*) is configured to move on the upper left connecting piece (5*b*) in a horizontal direction, then the axial inductive sensor (8) is driven to move left and right, thus the rotary parts of different sizes or shapes can be measured, and the large high-speed rotary device gap stacking assembly apparatus based on digital twin in this embodiment is more flexible.

Embodiment 4. This embodiment is described as shown in FIG. 1, this embodiment is to illustrate the motion trail of the lower left transverse measuring rod (6*a*) in the large high-speed rotary device gap stacking assembly apparatus based on digital twin in Embodiment 1, and the lower left transverse measuring rod (6*a*) is configured to move on the lower left connecting piece (5*a*) in a horizontal direction.

According to this embodiment, in practical application, the lower left transverse measuring rod (6*a*) is configured to move on the lower left connecting piece (5*a*) in a horizontal direction, then the radial inductive sensor (7) is driven to move left and right, thus the rotary parts of different sizes or shapes can be measured, and the large high-speed rotary device gap stacking assembly apparatus based on digital twin in this embodiment is more flexible.

Embodiment 5. This embodiment is described as shown in FIG. 1. According to this embodiment, a granite base (1) is additionally arranged on the basis of the large high-speed rotary device gap stacking assembly apparatus based on digital twin in Embodiment 1, the air floatation rotary main shaft (2) is embedded in the center position of the granite base (1), and the vertical air floatation guide rail (3) is fixedly mounted on the granite base (1).

According to this embodiment, in practical application, the air floatation rotary main shaft (2) is embedded in the center position of the granite base (1). The vertical air floatation guide rail (3) is fixedly mounted on the granite base (1). The stability of the air floatation rotary main shaft (2) and the vertical air floatation guide rail (3) in the operation process is guaranteed, then the stability of the large high-speed rotary device gap stacking assembly apparatus based on digital twin in this embodiment is guaranteed, the apparatus cannot fall down when being collided by external force or other factors, and thus the safety of the assembly apparatus in this embodiment is improved.

Embodiment 6. This embodiment is described as shown in FIG. 1. According to this embodiment, AR glasses are additionally arranged on the basis of the large high-speed rotary device gap stacking assembly apparatus based on digital twin in Embodiment 1, the AR glasses (9) are connected with the upper computer (10), data information received and computed by the upper computer (10) is displayed on the AR glasses (9), and thus the data information can be displayed in real time.

According to this embodiment, in practical application, the data information received and computed by the upper computer (10) is displayed on the AR glasses (9), and thus the data information can be displayed in real time.

This embodiment provides the large high-speed rotary device gap stacking assembly apparatus based on digital twin, the AR glasses are configured to display the data information measured by the inductive sensor in the assembly process in real time so as to control the assembly process, and the AR glasses are capable of monitoring the data change generated by the multi-stage rotary parts in the assembly process in real time, and therefore, intelligent assembly is achieved.

Figure 2:
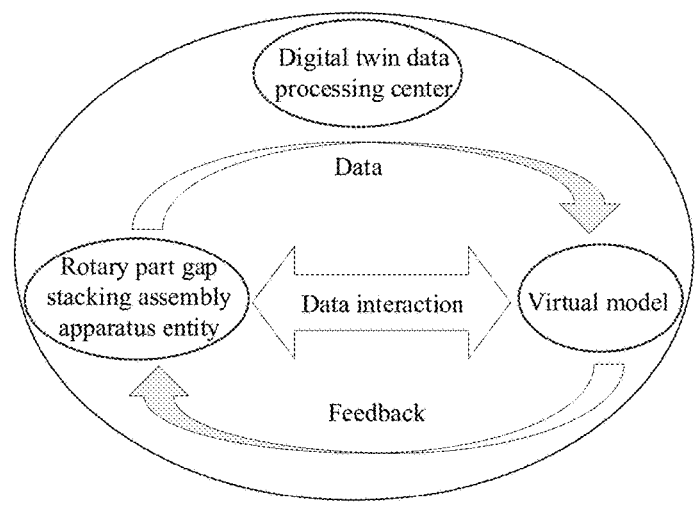
FIG. 2 is a data feedback flow diagram of a large high-speed rotary device gap stacking assembly method based on digital twin driving in an Embodiment 7.

Embodiment 7. This embodiment is described as shown in FIG. 1 and FIG. 2, this embodiment provides a large high-speed rotary device gap stacking assembly method based on digital twin, and the method is achieved based on the large high-speed rotary device gap stacking assembly apparatus based on digital twin according to any one of Embodiments 1 to 6. The method specifically includes the following steps:

S1, wearing the AR glasses (9), establishing data communication between the assembly apparatus entity (11) and the upper computer (10) through the data acquisition apparatus (13) by using a virtual-real registration technology, and establishing the virtual assembly model through the upper computer (10);

S2, placing a to-be-tested rotary part on the center-adjusting and inclination-adjusting workbench (4) for fixing;

S3, rotating the air floatation rotary main shaft (2) to drive the to-be-tested rotary part to rotate at a constant speed;

S4, driving the radial inductive sensor (7) to conduct sampling measurement on a radial mounting reference surface of the to-be-tested rotary part at equal intervals through the data acquisition apparatus (13) so as to obtain the radial reference surface eccentricity of the rotary part, transmitting the radial reference surface eccentricity to the virtual assembly model, and displaying the data information on the AR glasses (9) at the same time;

S5, driving the axial inductive sensor (8) to conduct sampling measurement on an axial mounting reference surface of the to-be-tested rotary part at equal intervals through the data acquisition apparatus (13) so as to obtain the axial reference surface eccentricity of the rotary part, transmitting the axial reference surface eccentricity to the virtual assembly model, and displaying data information on the AR glasses (9) at the same time;

S6, arranging the center-adjusting and inclination-adjusting workbench (4) through the virtual assembly model according to the magnitude and direction of the radial reference surface eccentricity and the axial reference surface eccentricity of the rotary part so as to make the rotary part and the center-adjusting and inclination-adjusting workbench (4) concentric;

S7, driving the radial inductive sensor (7) to conduct sampling measurement on a radial mounting measurement surface of the rotary part at equal intervals through the data acquisition apparatus (13) so as to obtain the concentricity of the rotary part, and transmitting the concentricity to the virtual assembly model; driving the axial inductive sensor (8) to conduct sampling measurement on an axial mounting measurement surface of the rotary part at equal intervals through the data acquisition apparatus (13) so as to obtain the perpendicularity of the rotary part, and transmitting the perpendicularity to the virtual assembly model;

S8, driving the inductive sensor to measure all the rotary parts required for assembly through the data acquisition apparatus (13) so as to obtain the concentricity and the perpendicularity of the multi-stage rotary parts, transmitting the concentricity and the perpendicularity to the virtual assembly model, and displaying data information on the AR glasses (9) at the same time;

S9, integrating the collected data information through the virtual assembly model, and analyzing and computing an accumulated eccentric error generated by gap stacking of the multi-stage rotary parts through the upper computer (10) according to the concentricity and the perpendicularity of the multi-stage rotary parts;

$$Rotor_{0-n} = \sum_{i=1}^{n} Rotor_{ri} Rotor_{Zi} Rotor_{clearance i} Rotor_{dzi} Rotor_{orientation i}$$

$$= \begin{bmatrix} \prod_{i=1}^{n} Mo_{Zi} Mo_{Xi} Mo_{Yi} & \sum_{i=1}^{n} \left( \prod_{j=2}^{i} Mo_{Zj-1} Mo_{Xj-1} Mo_{Yj-1} \right) Mo_{Zi}(S_i + dS'_i + dS_i) \\ 0^T & 1 \end{bmatrix}$$

S10, computing the optimal coaxiality of the multi-stage rotary parts in gap stacking through the upper computer (10) according to the accumulated eccentric error generated by gap stacking of the multi-stage rotary parts, and displaying the optimal coaxiality of the multi-stage rotary parts in gap stacking on the AR glasses (9); and S11, controlling the assembly process by using the virtual assembly model and the optimal coaxiality of the multi-stage rotary parts in gap stacking displayed on the AR glasses (9).

According to this embodiment, in practical application, the worker wears the AR glasses and establishes data communication between the assembly apparatus entity and the upper computer through the data acquisition apparatus by using the virtual-real registration technology, and the upper computer is configured to establish the virtual assembly model. The inductive sensor is driven by the data acquisition apparatus to acquire data information of the rotary parts and transmit the data information to the virtual assembly model for integration; the upper computer is configured to analyze and compute the data information to obtain optimal coaxiality of the multi-stage rotary parts in gap stacking. Meanwhile, the data information and the optimal coaxiality of the multi-stage rotary parts in gap stacking are displayed on the AR glasses. A worker can control the assembly process through the virtual assembly model and the optimal coaxiality of multi-stage rotary part in gap stacking displayed on the AR glasses.

This embodiment provides the large high-speed rotary device gap stacking assembly method based on digital twin, and the method is achieved based on the assembly apparatus according to any one of the Embodiments 1 to 6. The method includes the steps that the worker wears the AR glasses and establishes data communication between the assembly apparatus entity and the upper computer through the data acquisition apparatus by using the virtual-real registration technology, and the upper computer is configured to establish the virtual assembly model. The inductive sensor is driven by the data acquisition apparatus to acquire different data information of the rotary parts and transmit the data information to the virtual assembly model for integration. Meanwhile, the upper computer is configured to analyze and compute the data information to obtain optimal coaxiality of the multi-stage rotary parts in gap stacking, and the optimal coaxiality of the multi-stage rotary parts in gap stacking are displayed on the AR glasses at the same time. A worker can control the assembly process through the virtual assembly model and the optimal coaxiality of multi-stage rotary part in gap stacking displayed on the AR glasses (9).

Embodiment 8. This embodiment is to illustrate the accumulated eccentric error generated by gap stacking of the multi-stage rotary parts in the step S9 in the large high-speed rotary device gap stacking assembly method based on digital twin in Embodiment 7, and the accumulated eccentric error generated by gap stacking of the multi-stage rotary parts is specifically as follows:

wherein $Rotor_{ri}$ is a transformation matrix between joint surfaces of two-stage rotary parts; $Rotor_{Zi}$ is the eccentricity of an ideal circle center of a rotary part i; $Rotor_{clearance i}$ is a translation transformation matrix of the reference surface gap eccentricity of the rotary part i; $Rotor_{dzi}$ is an eccentric translation transformation matrix caused by a reference surface machining error of the rotary part i; $Rotor_{orientation i}$ is a rotation transformation matrix from the reference surface of the rotary part i to the rotation center of an assembly surface; $Mo_{Xi}$ is a rotation matrix of the reference surface of an $i^{th}$-stage rotary part around an X axis; $Mo_{Yi}$ is the rotation matrix of the reference surface of the $i^{th}$-stage rotary part around a Y axis; $Mo_{Zi}$ is the rotation matrix of the $i^{th}$-stage rotary part around a Z axis; $S_i$, is an ideal position vector of the circle center of the assembly surface of the $i^{th}$-stage rotary part; $dS'_i$ is a gap eccentric position vector of the $i^{th}$-stage rotary part; and $dS_i$ is a machining error vector of the circle center position of the assembly surface of the $i^{th}$-stage rotary part.

Embodiment 9. This embodiment is to illustrate step S10 in the large high-speed rotary device gap stacking assembly method based on digital twin in Embodiment 7.

The upper computer (10) is configured to compute axial projections of the circle center positions of the assembly surfaces of the multi-stage rotary parts according to the accumulated eccentric error generated by the gap stacking of the multi-stage rotary parts, and then the upper computer (10) is configured to compute the optimal coaxiality of the multi-stage rotary part in gap stacking according to the axial projections of the circle center positions of the assembly surfaces of the multi-stage rotary parts.

According to this embodiment, in practical application, double maximum modulus of the axial projections of the circle center positions of the assembly surfaces of the multi-stage rotary parts is the optimal coaxiality of the multi-stage rotary parts in gap stacking.

Embodiment 10. This embodiment is to illustrate the axial projections of the circle center positions of the assembly surfaces of the multi-stage rotary parts in the large high-speed rotary device gap stacking assembly method based on digital twin, and the axial projections of the circle center positions of the assembly surfaces of the multi-stage rotary parts are specifically as follows:

$$\begin{bmatrix} dx_{0-n} \\ dy_{0-n} \end{bmatrix} = \sum_{i=1}^{n} \left( \prod_{j=2}^{i} Mo_{Zj-1} Mo_{Xj-1} Mo_{Yj-1} \right) Mo_{Zi}(S_i + dS'_i + dS_i)$$

wherein $Mo_{Zi}$ is the rotation matrix of the $i^{th}$-stage rotary part around the Z axis; $S_i$ is the ideal position vector of the circle center of the assembly surface of the $i^{th}$-stage rotary part; $dS'_i$ is the gap eccentric position vector of the $i^{th}$-stage rotary part; and $dS_i$ is the machining error vector of the circle center position of the assembly surface of the $i^{th}$-stage rotary part.

The above is only the embodiments of the disclosure and is not limited to the disclosure, and for those of skill in the art, the disclosure may have various changes and variations. Any modification, equivalent replacement, improvement, etc. made within the spirit and principle of the disclosure shall be included in the claim range of the disclosure.

What is claimed is:

1. A large high-speed rotary device gap stacking assembly apparatus based on digital twin, comprising an assembly apparatus entity, a data acquisition apparatus and an upper computer, wherein
the assembly apparatus entity is configured to establish data communication with the upper computer through the data acquisition apparatus, and the upper computer is configured to establish a virtual assembly model;
the assembly apparatus entity comprises an air floatation rotary main shaft, a vertical air floatation guide rail, a center-adjusting and inclination-adjusting workbench, an upper left connecting piece, a lower left connecting piece, an upper left transverse measuring rod, a lower left transverse measuring rod and an inductive sensor;
the center-adjusting and inclination-adjusting workbench is stacked on the air floatation rotary main shaft, and the center-adjusting and inclination-adjusting workbench is coaxial with the air floatation rotary main shaft; the vertical air floatation guide rail is arranged on the side surface of the air floatation rotary main shaft, the upper left connecting piece and the lower left connecting piece are sequentially arranged on the vertical air floatation guide rail in a sleeving mode from top to bottom, the upper left transverse measuring rod is nested on the upper left connecting piece, and the lower left transverse measuring rod is nested on the lower left connecting piece;
the inductive sensor comprises an axial inductive sensor and a radial inductive sensor, the axial inductive sensor is fixed on the upper left transverse measuring rod and is configured to detect axial surface data of rotary parts, and the radial inductive sensor is fixed on the lower left transverse measuring rod and is configured to detect radial surface data of the rotary parts; and
the data acquisition apparatus is configured to drive the inductive sensor to acquire data and transmit the data to the upper computer, the upper computer is configured to integrate the acquired data to the virtual assembly model, and synchronously analyze and compute the acquired data and obtain optimal coaxiality of the multi-stage rotary parts in gap stacking.

2. The large high-speed rotary device gap stacking assembly apparatus based on digital twin according to claim 1, wherein the upper left connecting piece and the lower left connecting piece are configured to slide on the vertical air floatation guide rail in a vertical direction.

3. The large high-speed rotary device gap stacking assembly apparatus based on digital twin according to claim 1, wherein the upper left transverse measuring rod is configured to move on the upper left connecting piece in a horizontal direction.

4. The large high-speed rotary device gap stacking assembly apparatus based on digital twin according to claim 1, wherein the lower left transverse measuring rod is configured to move on the lower left connecting piece bin a horizontal direction.

5. The large high-speed rotary device gap stacking assembly apparatus based on digital twin according to claim 1, wherein the assembly apparatus further comprises a granite base, the air floatation rotary main shaft is embedded in the center position of the granite base, and the vertical air floatation guide rail is fixedly mounted on the granite base.

6. The large high-speed rotary device gap stacking assembly apparatus based on digital twin according to claim 1, wherein the assembly apparatus further comprises AR glasses, the AR glasses are connected with the upper computer, data information received and computed by the upper computer is displayed on the AR glasses, and thus the data information can be displayed in real time.

7. A large high-speed rotary device gap stacking assembly method based on digital twin, being achieved by using the large high-speed rotary device gap stacking assembly apparatus based on digital twin according to claim 1, the method comprising the following steps:
S1, wearing the AR glasses, establishing data communication between the assembly apparatus entity and the upper computer through the data acquisition apparatus by using a virtual-real registration technology, and establishing the virtual assembly model through the upper computer;
S2, placing a to-be-tested rotary part on the center-adjusting and inclination-adjusting workbench for fixing;

S3, rotating the air floatation rotary main shaft to drive the to-be-tested rotary part to rotate at a constant speed;

S4, driving the radial inductive sensor to conduct sampling measurement on a radial mounting reference surface of the to-be-tested rotary part at equal intervals through the data acquisition apparatus and obtaining the radial reference surface eccentricity of the rotary part, transmitting the radial reference surface eccentricity to the virtual assembly model, and displaying the data information on the AR glasses at the same time;

S5, driving the axial inductive sensor to conduct sampling measurement on an axial mounting reference surface of the to-be-tested rotary part at equal intervals through the data acquisition apparatus and obtaining the axial reference surface eccentricity of the rotary part, transmitting the axial reference surface eccentricity to the virtual assembly model, and displaying data information on the AR glasses at the same time;

S6, arranging the center-adjusting and inclination-adjusting workbench through the virtual assembly model according to the magnitude and direction of the radial reference surface eccentricity and the axial reference surface eccentricity of the rotary part and making the rotary part and the center-adjusting and inclination-adjusting workbench concentric;

S7, driving the radial inductive sensor to conduct sampling measurement on a radial mounting measurement surface of the rotary part at equal intervals through the data acquisition apparatus and obtaining the concentricity of the rotary part, and transmitting the concentricity to the virtual assembly model; driving the axial inductive sensor to conduct sampling measurement on an axial mounting measurement surface of the rotary part at equal intervals through the data acquisition apparatus and obtaining the perpendicularity of the rotary part, and transmitting the perpendicularity to the virtual assembly model;

S8, driving the inductive sensor to measure all the rotary parts required for assembly through the data acquisition apparatus and obtaining the concentricity and the perpendicularity of the multi-stage rotary parts, transmitting the concentricity and the perpendicularity to the virtual assembly model, and displaying data information on the AR glasses at the same time;

S9, integrating the collected data information through the virtual assembly model, and analyzing and computing an accumulated eccentric error generated by gap stacking of the multi-stage rotary parts through the upper computer according to the concentricity and the perpendicularity of the multi-stage rotary parts;

S10, computing the optimal coaxiality of the multi-stage rotary parts in gap stacking through the upper computer according to the accumulated eccentric error generated by gap stacking of the multi-stage rotary parts, and displaying the optimal coaxiality of the multi-stage rotary parts in gap stacking on the AR glasses; and S11, controlling the assembly process by using the virtual assembly model and the optimal coaxiality of the multi-stage rotary parts in gap stacking displayed on the AR glasses.

8. The large high-speed rotary device gap stacking assembly method based on digital twin according to claim 7, wherein the accumulated eccentric error generated by gap stacking of the multi-stage rotary parts in step S9 is specifically as follows:

$$\text{Rotor}_{0-n} = \sum_{i=1}^{n} \text{Rotor}_{ri}\text{Rotor}_{Zi}\text{Rotor}_{clearancei}\text{Rotor}_{dzi}\text{Rotor}_{orientationi}$$

$$= \begin{bmatrix} \prod_{i=1}^{n} Mo_{Zi}Mo_{Xi}Mo_{Yi} & \sum_{i=1}^{n}\left(\prod_{j=2}^{i} Mo_{Zj-1}Mo_{Xj-1}Mo_{Yj-1}\right)Mo_{Zi}(S_i + dS'_i + dS_i) \\ 0^T & 1 \end{bmatrix}$$

wherein $\text{Rotor}_{ri}$ is a transformation matrix between joint surfaces of two-stage rotary parts; $\text{Rotor}_{Zi}$ is the eccentricity of an ideal circle center of a rotary part i; $\text{Rotor}_{clearancei}$ is a translation transformation matrix of the reference surface gap eccentricity of the rotary part i; $\text{Rotor}_{dzi}$ is an eccentric translation transformation matrix caused by a reference surface machining error of the rotary part i; $\text{Rotor}_{orientationi}$ is a rotation transformation matrix from the reference surface of the rotary part i to the rotation center of an assembly surface; $Mo_{Xi}$ is a rotation matrix of the reference surface of an $i^{th}$-stage rotary part around an X axis; $Mo_{Yi}$ is the rotation matrix of the reference surface of the $i^{th}$-stage rotary part around a Y axis; $Mo_{Zi}$ is the rotation matrix of the $i^{th}$-stage rotary part around a Z axis; $S_i$ is an ideal position vector of the circle center of the assembly surface of the $i^{th}$-stage rotary part; $dS'_i$ is a gap eccentric position vector of the $i^{th}$-stage rotary part; $dS_i$ is a machining error vector of the circle center position of the assembly surface of the $i^{th}$-stage rotary part; $Mo_{Zj-1}$ is the rotation matrix of the reference surface of a $(j-1)^{th}$-stage rotary part around the Z axis; $Mo_{Xj-1}$ is the rotation matrix of the reference surface of the $(j-1)^{th}$-stage rotary part around the X axis; and $Mo_{Yj-1}$ is the rotation matrix of the reference surface of the $(j-1)^{th}$-stage rotary part around the Y axis.

9. The large high-speed rotary device gap stacking assembly method based on digital twin according to claim 7, wherein the step S10 specifically comprises:

computing axial projections of the circle center positions of the assembly surfaces of the multi-stage rotary parts through the upper computer according to the accumulated eccentric error generated by the gap stacking of the multi-stage rotary parts, and computing the optimal coaxiality of the multi-stage rotary part in gap stacking through the upper computer according to the axial projections of the circle center positions of the assembly surfaces of the multi-stage rotary parts.

10. The large high-speed rotary device gap stacking assembly method based on digital twin according to claim 9, wherein the axial projections of the circle center positions of the assembly surfaces of the multi-stage rotary parts are specifically as follows:

$$\begin{bmatrix} dx_{0-n} \\ dy_{0-n} \end{bmatrix} = \sum_{i=1}^{n}\left(\prod_{j=2}^{i} Mo_{Zj-1}Mo_{Xj-1}Mo_{Yj-1}\right)Mo_{Zi}(S_i + dS'_i + dS_i)$$

wherein $Mo_{Z_i}$ is the rotation matrix of the $i^{th}$-stage rotary part around the Z axis; $S_i$ is the ideal position vector of the circle center of the assembly surface of the $i^{th}$-stage rotary part; $dS'_i$ is the gap eccentric position vector of the $i^{th}$-stage rotary part; and $dS_i$ is the machining error vector of the circle center position of the assembly surface of the $i^{th}$-stage rotary part.

* * * * *